United States Patent [19]
Shimizu et al.

[11] Patent Number: 5,836,159
[45] Date of Patent: Nov. 17, 1998

[54] MECHANISM OF RETURNING TO NEUTRAL FOR AXLE DRIVING APPARATUS

[75] Inventors: Hiroaki Shimizu; Ryota Ohashi, both of Amagasaki, Japan

[73] Assignee: Kanzaki Kokyukoki Mfg. Co., Ltd., Japan

[21] Appl. No.: 872,672

[22] Filed: Jun. 11, 1997

[30] Foreign Application Priority Data

Jun. 26, 1996 [JP] Japan .................................. 8-166225

[51] Int. Cl.$^6$ .................................................. F16D 39/00
[52] U.S. Cl. .............................................. 60/487; 92/12.2
[58] Field of Search ................................ 60/487; 91/504, 91/505; 92/12.1, 12.2

[56] References Cited

U.S. PATENT DOCUMENTS

| | | | |
|---|---|---|---|
| 3,837,235 | 9/1974 | Peterson | 192/4 B |
| 5,094,077 | 3/1992 | Okada. | |
| 5,239,827 | 8/1993 | Havens | 60/487 |

FOREIGN PATENT DOCUMENTS

| | | | |
|---|---|---|---|
| 720656 | 11/1965 | Canada | 91/505 |

*Primary Examiner*—F. Daniel Lopez
*Attorney, Agent, or Firm*—Sterne Kessler Goldstein & Fox P.L.L.C.

[57] ABSTRACT

A hydrostatic transmission comprising a hydraulic pump and a hydraulic motor fluidly connected with each other through a closed fluid circuit. Pistons press against a control arm connected with a movable swash plate of the hydraulic pump and generate a friction force when the movable swash plate, which has been rotated slantwise, automatically returns toward the neutral position by a neutral return spring. The movable swash plate gradually returns to the neutral position by pressure of the piston. A discharging oil hole is open at the utmost end of each of the pistons for draining a portion of operating oil which operates the piston in the closed fluid circuit to the interior of a housing. Grooves are formed along a surface of the control arm abutting against the pistons. When the movable swash plate is rotated between the neutral position and a predetermined position, the discharging oil holes are connected to the interior of the housing through the grooves so as to release the oil pressure out of the closed fluid circuit. Thus, braking shock can be moderated and the neutral position can be expanded.

3 Claims, 22 Drawing Sheets

5,836,159

MECHANISM OF RETURNING TO NEUTRAL FOR AXLE DRIVING APPARATUS

BACKGROUND OF THE INVENTION

1. Field of the Invention

The present invention relates to a mechanism for automatically returning a movable swash plate to the neutral position in an axle driving apparatus which drives the axles thereof by a hydrostatic transmission (hereinafter referred to as an "HST") for steplessly changing the rotational speed of an engine, wherein resistance is given to the movable swash plate and pressure generated in a closed fluid circuit of the HST escapes therefrom when the movable swash plate returns to the neutral position, so as to prevent the vehicle from a sudden stop.

2. Related Art

Conventionally, an HST comprising a hydraulic pump and a hydraulic motor, which are fluidly connected through a closed fluid circuit, has a control arm which engages with a movable swash plate of the hydraulic pump. The quantity of oil discharged from the hydraulic pump can be changed in a stepless fashion by rotation of the control arm. The control arm is regularly biased by a neutral return spring, whereby the movable swash plate is automatically returned to its neutral position by the neutral return spring when an operator stops speed changing operation and releases the operational power. Accordingly, the movable swash plate suddenly returns to the neutral position when the operating force is released at a high speed position of the movable swash plate and operating oil which has smoothly circulated in the closed fluid circuit theretofore is blocked in the hydraulic pump so that the rotation of the hydraulic motor is suddenly stopped. In other words, a dynamic brake is applied. Therefore, a control arm is often provided with a shock absorber to prevent sudden returning to its neutral position, as disclosed in U.S. Pat. No. 5,094,077, for example.

A shock absorber which is provided to prevent the control arm from suddenly returning to its neutral position is disposed on the outside of the HST housing so as to enable mounting and exchange thereof. However, a shock absorber which uses gas or fluid for shock absorption is heated by radiation of the housing which is heated by the rising temperature of the oil therein and is affected by the temperature of the outside air. The gas or fluid expands or contracts because of such a change of temperature so that operation of the shock absorber differs according to temperature or, in some cases, the neutral position can not be fixed at a high or a low temperature.

Further, a shock absorber mounted on the outside of the housing requires space for it to be mounted which can restrict the shape of the axle driving apparatus. As a result, the entire axle driving apparatus becomes larger. Also, because the shock absorber is mounted outside of the housing, the movable portion of the shock absorber is conventionally covered with a protector such as a rubber boot to avoid penetration of water, dust or other foreign matter, and therefore, requires an increase in the number of parts and in the cost.

SUMMARY OF THE INVENTION

In an HST wherein a hydraulic pump and a hydraulic motor are fluidly connected through a closed fluid circuit, a movable swash plate of the hydraulic pump is slantingly rotated from its neutral position by rotation of a control arm connected at one end to the movable swash plate, whereby the quantity of oil discharged from the hydraulic pump is changed and the rotation of the hydraulic motor is steplessly changed. When the operator removes manual pressure from the control arm in the rotated condition, the movable swash plate which had been slantingly rotated, is automatically returned to its neutral position by the biasing force of a neutral return spring. If the movable swash plate is suddenly returned to its neutral position, operating oil which has smoothly circulated in the closed fluid circuit previously, is blocked in the hydraulic pump so that the rotation of the hydraulic motor is suddenly stopped.

The present invention avoids the above problems by providing pistons that are pressed against the control arm or a part following the control arm. The pistons provide resistance while the movable swash plate is slantingly rotated from its neutral position so that when the control arm, which is no longer under pressure from the operator, tends to return to its neutral position, the control arm returns gradually by the pressure of pistons.

The pistons are slidably provided into the pair of closed fluid circuits which are substantially parallel to each other and are formed in the HST center section. Each piston closes each opening of the pair of oil passages and projects at its utmost end from the opening so as to form a part abutting against the control arm. Preferably, an oil hole is open on the surface of the utmost end of the piston for draining a portion of the operating oil in the closed fluid circuit which operates the piston. Grooves are formed on a portion of the contact surface of the control arm against which the ends of the pair of pistons abut. Each of the grooves communicates with an oil hole to the inside of the housing while the movable swash plate is slantingly rotated from its neutral position to a fixed position.

DESCRIPTION OF THE PREFERRED EMBODIMENT

Figure 1:
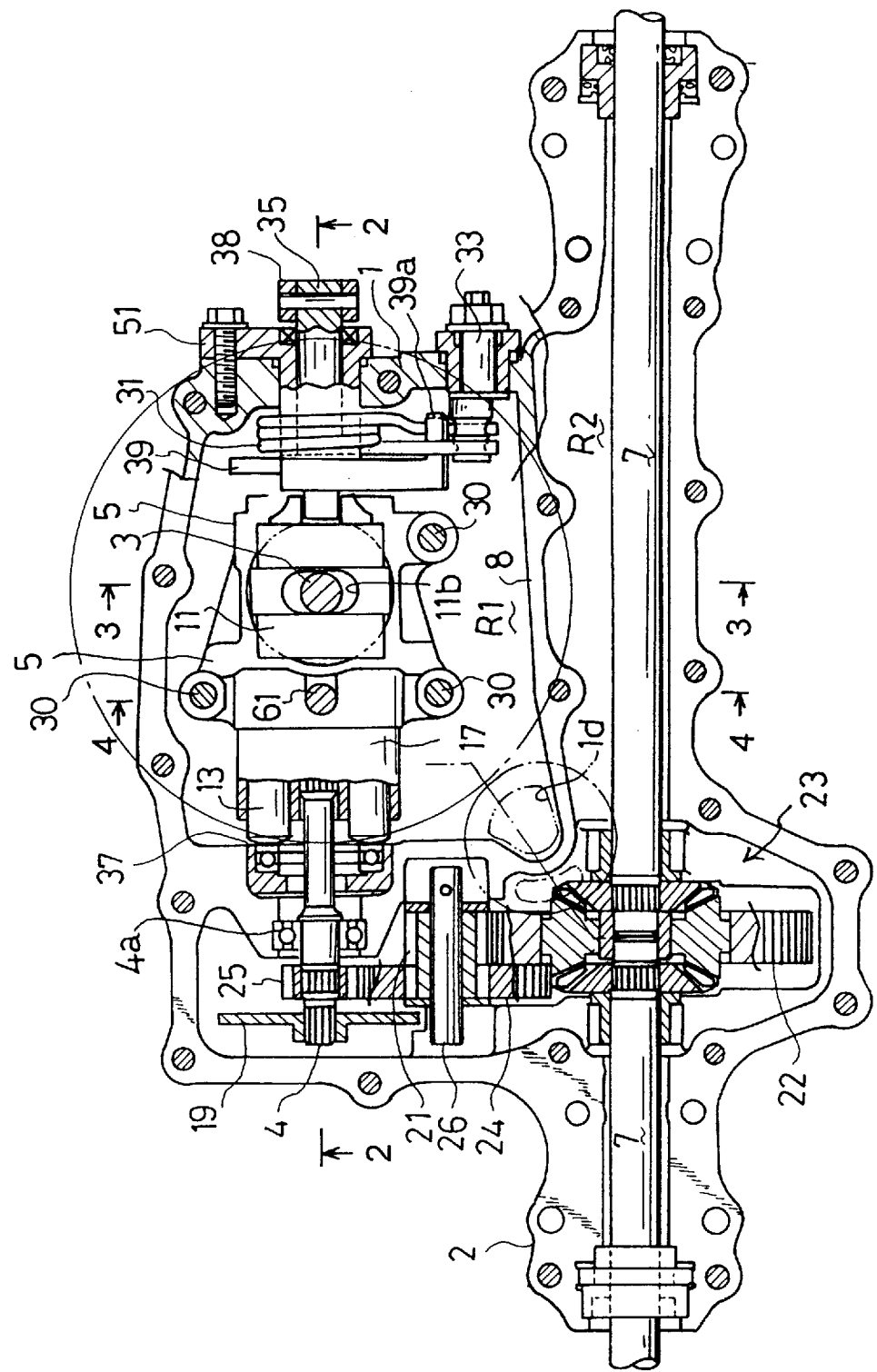
FIG. 1 is a plan view, partly in cross section, of an axle driving apparatus of the present invention, from which an upper half housing has been removed.

Explanation will first be given on the entire construction of an axle driving apparatus having the neutral return mechanism of the present invention. FIGS. 1, 2, 3 and 4 show a housing constructed by joining an upper half housing 1 and a lower half housing 2 along horizontal joint surfaces. At the joint surfaces is provided a bearing for a motor shaft 4. Bearings for axles 7 are shifted upwardly from the joint surfaces of the housing and are disposed in upper half housing 1 to rotatably support axles 7. Axles 7 are differentially coupled by a differential gear unit 23. One end of each axle 7 projects laterally from the housing, The interior of the housing is divided by an inner wall 8 into a first chamber R1 for housing an HST and a second chamber R2 for housing differential gear unit 23, a transmission gear unit for transmitting power from motor shaft 4 to differential gear unit 23 and axles 7. First and second chambers R1 and R2 are filled with lubricating oil in common so as to form an oil sump. An air reservoir (not shown) is formed above differential gear unit 23 in upper half housing 1. An oil supply hole is bored through the portion of the housing which is above the air reservoir, enabling oil to be supplied thereto.

Figure 5:
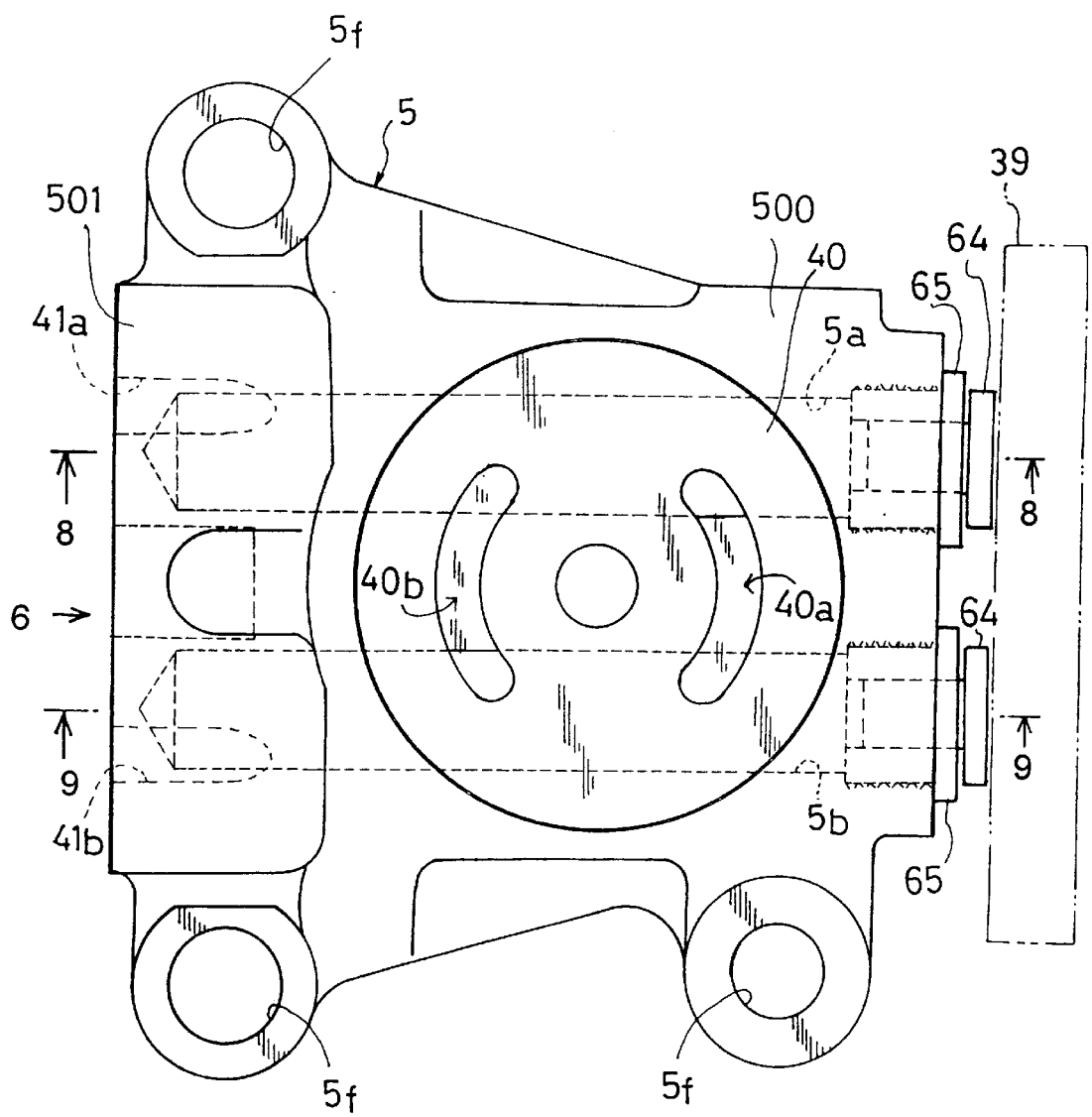
FIG. 5 is a plan view of center section 5 of the present invention.

Within first chamber R1 is mounted a center section 5 which is L-like shaped when viewed from the side and has a horizontal portion 500 and a vertical portion 501. At the peripheral portions of horizontal portion 500 are vertically open through bores 5f at three positions, as shown in FIG. 5. A mounting bolt 30 is inserted into each through bore 5f from below to fix center section 5 to the inside of upper half housing 1. On the upper surface of horizontal portion 500 of center section 5 is formed a pump mounting surface 40. A cylinder block 16 is rotatably and slidably disposed thereon. Pistons 12 are fitted, through biasing springs, into a plurality of cylinder bores in cylinder block 16 and are reciprocally movable. A thrust bearing 11a of a movable swash plate 11 abuts against the heads of pistons 12. An opening 11b is provided at the center of movable swash plate 11 so as to enable a pump shaft 3 to perforate therethrough. Pump shaft 3 is also used as an input shaft and is vertically disposed and is not relatively rotatably retained onto the axis of rotation of cylinder block 16, thereby constituting an axial piston type hydraulic pump. Pump shaft 3 projects outwardly at the upper end thereof from upper half housing 1. An input pulley 43, with a cooling fan 44, is fixed onto pump shaft 3. Input pulley 43 receives power from a prime mover (not shown) through a belt transmitting mechanism (also not shown).

Figure 6:
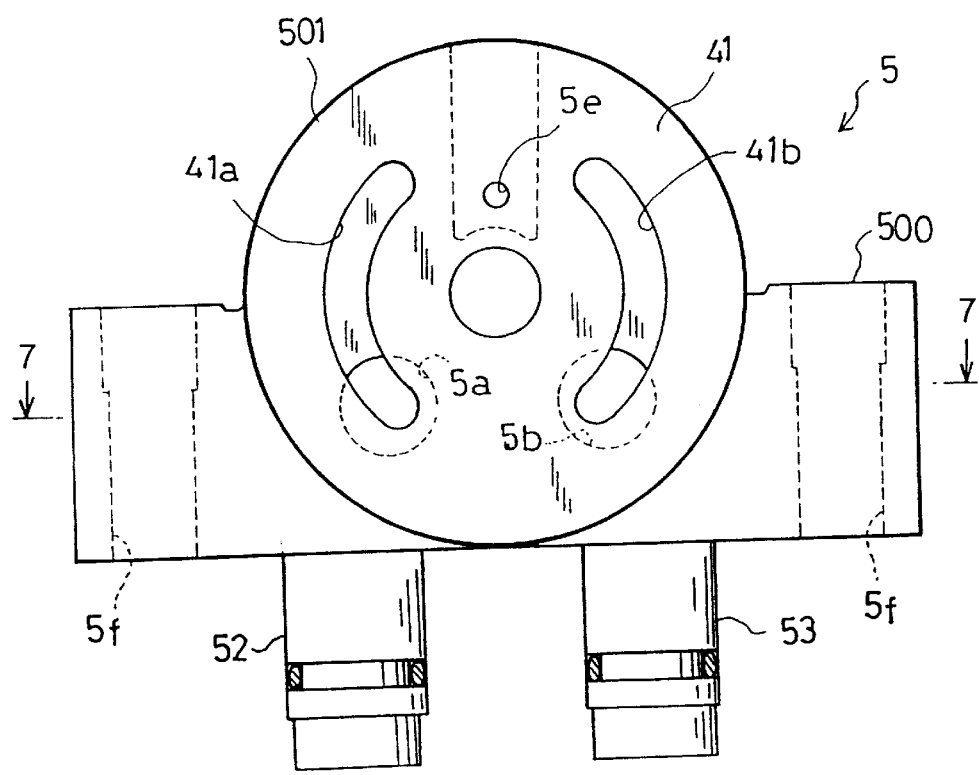
FIG. 6 is a view looking in the direction of arrow 6 in FIG. 5.

As shown in FIG. 6, at the outside surface of vertical portion 501 of center section 5 is formed a motor mounting surface 41 on which a cylinder block 17 is rotatably supported. A plurality of pistons 13 are fitted into a plurality of cylinder bores in cylinder block 17. Pistons 13 are reciprocally movable whereby the heads thereof abut against a fixed swash plate 37 which is fixedly sandwiched between upper half housing 1 and lower half housing 2. Motor shaft 4 is horizontally disposed on the axis of rotation of cylinder block 17 and is not relatively rotatably retained thereto so as to constitute an axial piston type hydraulic motor. Motor shaft 4 is also rotatably supported by a bearing bore provided on vertical portion 501 of center section 5 and by a bearing 4a with a seal held at the joint surfaces of upper half housing 1 and lower half housing 2.

Figure 2:
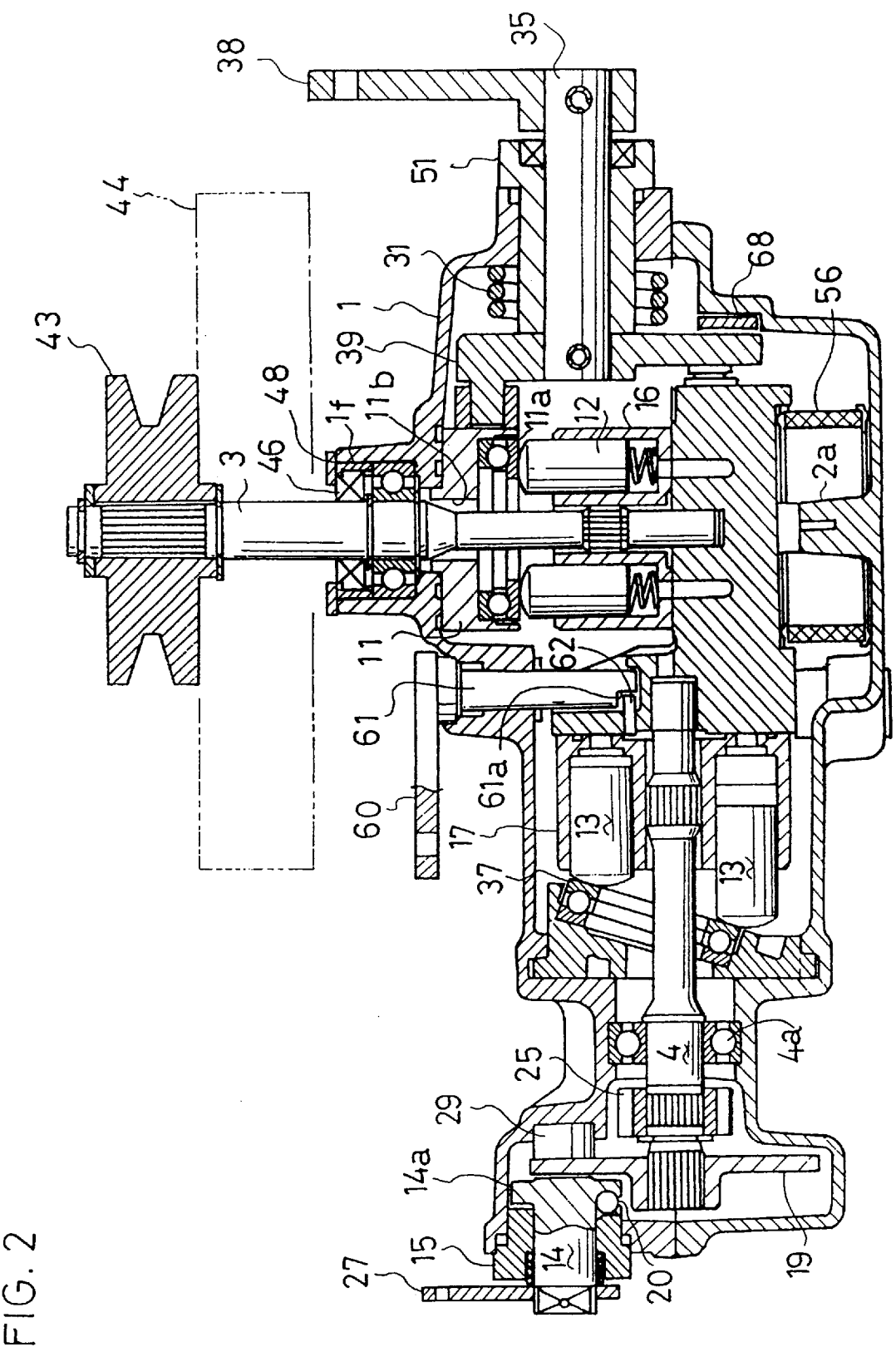
FIG. 2 is a cross-sectional view looking in the direction of arrows 2—2 in FIG. 1.

Transmission gear unit for transmitting power from motor shaft 4 to differential gear unit 23 is shown in FIGS. 1 and 2. A gear 25 engageable with a larger diameter gear 24 on counter shaft 26 is provided on motor shaft 4 where it enters into second chamber R2. A smaller diameter gear 21 on counter shaft 26 engages with a ring gear 22 of differential gear unit 23. Ring gear 22 drives differential gear unit 23 so as to transmit power to left and right axles 7.

As shown in FIG. 2, a brake disk 19 is fixed onto an axial end of motor shaft 4 positioned in second chamber R2. A brake operating shaft 14 is supported by upper half housing 1 through a bush 15. A brake arm 27 is fixed to the outer end of brake operating shaft 14 projecting from the housing. When brake arm 27 is rotated, balls 20 ride on cam grooves provided on a flange 14a. Brake operating shaft 14 slides toward brake disk 19, so that the brake disk 19 is put between the inner end surface of brake operating shaft 14 and a brake pad 29, thereby exerting a braking action to motor shaft 4.

As shown in FIG. 5, a pair of arcuate ports 40a and 40b are open along pump mounting surface 40 on horizontal portion 500 of center section 5 so that the feed oil discharged from cylinder block 16 is introduced into center section 5. As shown in FIG. 6, a pair of arcuate ports 41a and 41b are open on the motor mounting surface 41 of vertical portion 501 thereby introducing feed discharge oil into center section 5 from cylinder block 17.

Figure 7:
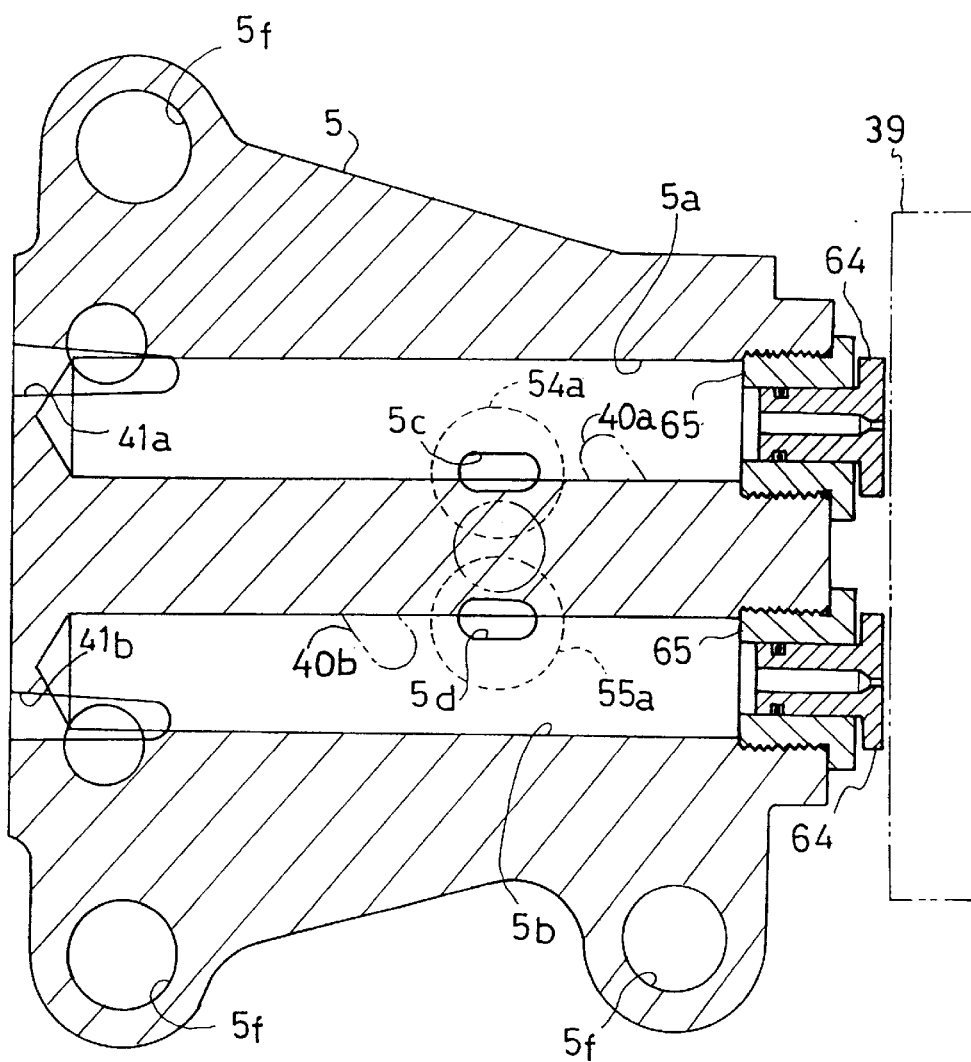
FIG. 7 is a cross-sectional view looking in the direction of arrows 7—7 in FIG. 6.
Figure 8:
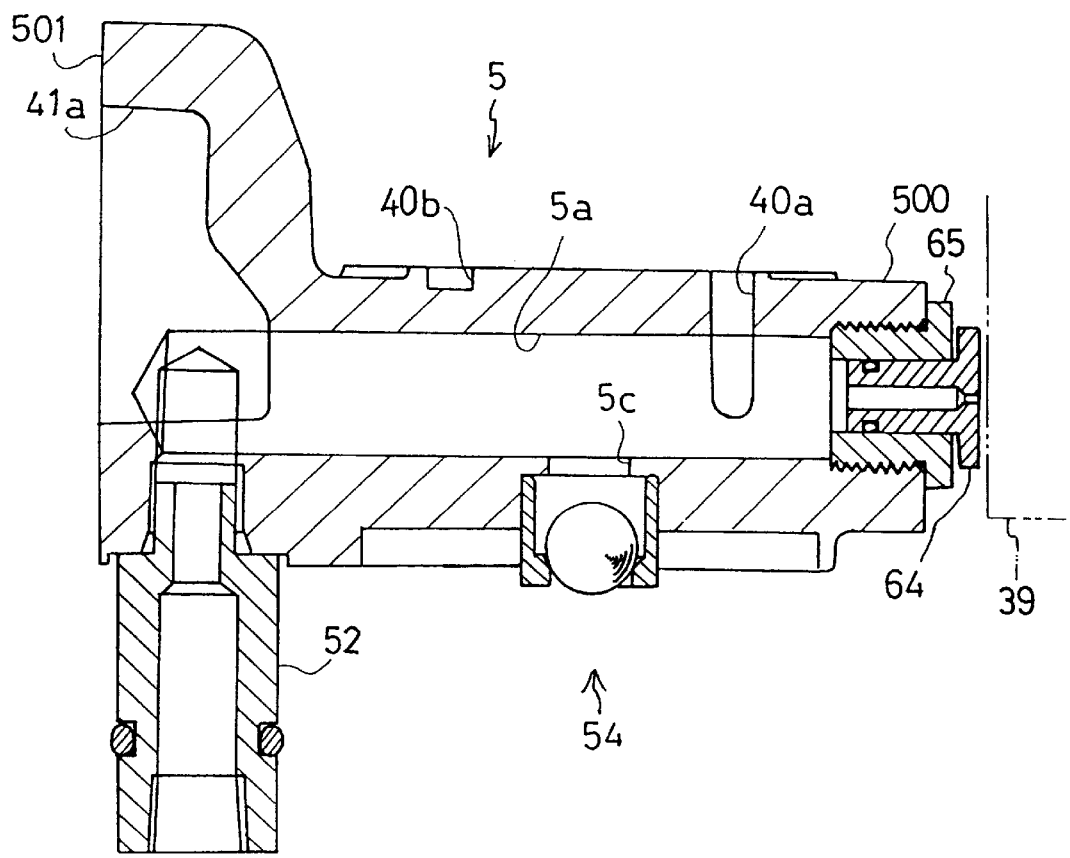
FIG. 8 is a cross-sectional view looking in the direction of arrows 8—8 in FIG. 5.
Figure 9:
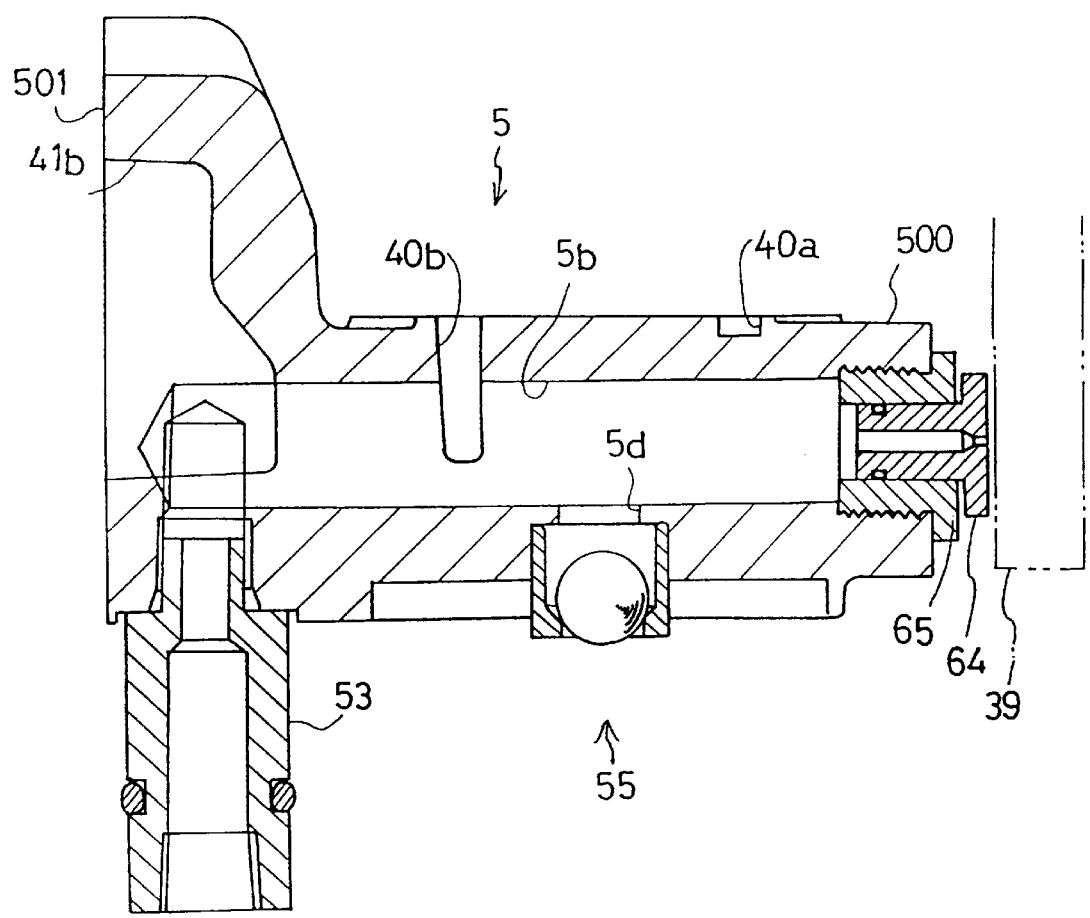
FIG. 9 is a cross-sectional view looking in the direction of arrows 9—9 in FIG. 5.

As shown in FIG. 7, a linear first oil passage 5a and a linear second oil passage 5b are drilled in parallel with each other within the thick horizontal portion 500 of center section 5 forming a closed fluid circuit for circulating operating oil between the hydraulic pump and the hydraulic motor. As shown in FIGS. 8 and 9, oiling pipes 52 and 53 communicating with first and second oil passages 5a and 5b are disposed on the lower surface of horizontal portion 500 of center section 5 and are exposed at the lower ends thereof at the outer bottom surface of lower half housing 2. After the axle driving apparatus has been assembled, the closed fluid circuit is filled with operating oil from the open end of each oiling pipe 52 and 53. Thereafter, the open end of each oiling pipe 52 and 53 is closed by a plug.

Figure 3:
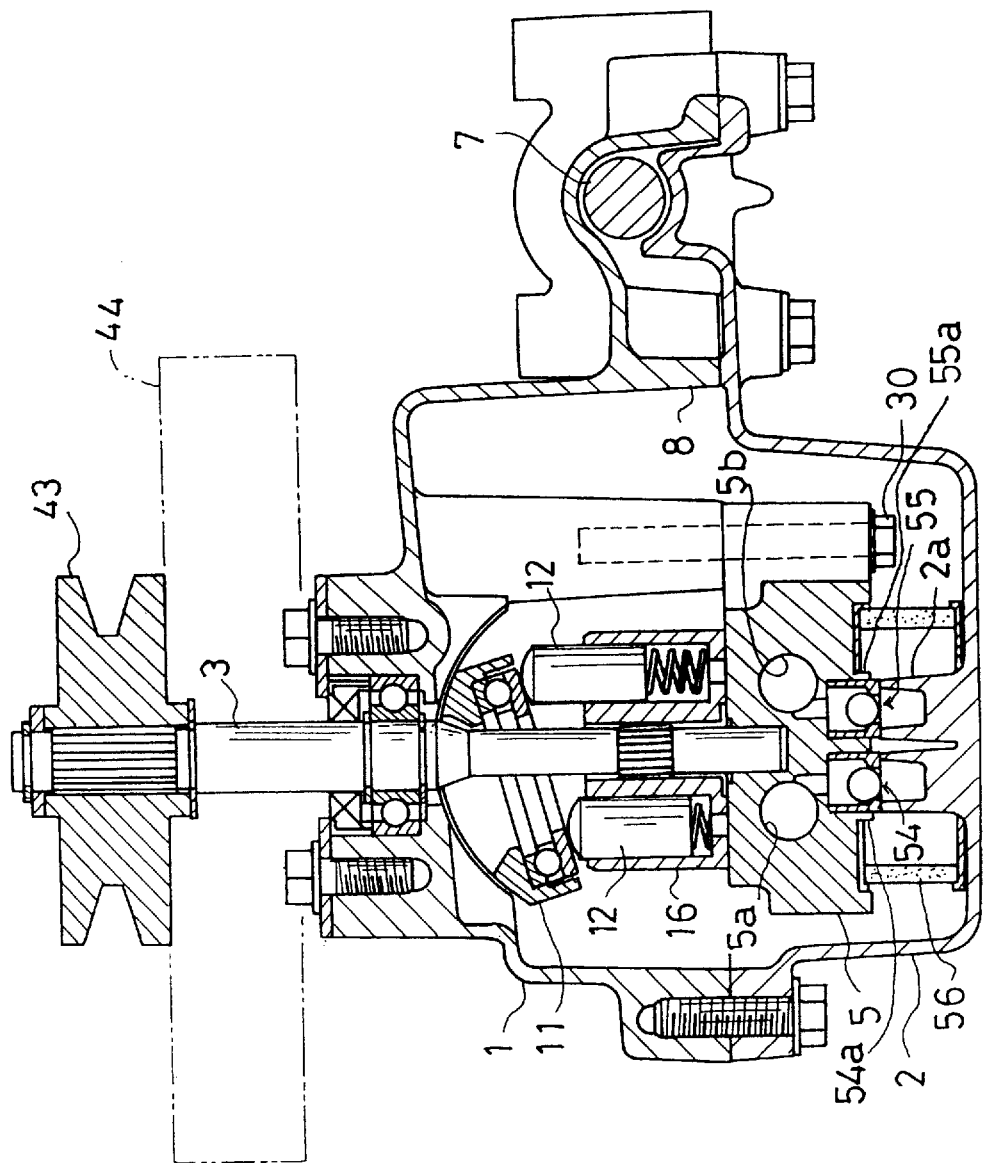
FIG. 3 is a cross-sectional view looking in the direction of arrows 3—3 in FIG. 1.

As shown in FIGS. 3, 7, 8 and 9, oil holes 5c and 5d are branched downwardly from the intermediate portion of first and second oil passages 5a and 5b. Oil holes 5c and 5d are open on the lower surface of horizontal portion 500 of center section 5. Check valves 54 and 55, which automatically open merely when oil is supplied, are disposed in the open end of oil holes 5c and 5d, respectively. As shown in FIG. 3, valve casings 54a and 55a are supported on projections 2a which project upwardly from the inner bottom surface of lower half housing 2. An annular oil filter 56 is disposed in the oil sump between the lower surface of center section 5 and the inner bottom surface of lower half housing 2 and surrounds projections 2a.

Figure 4:
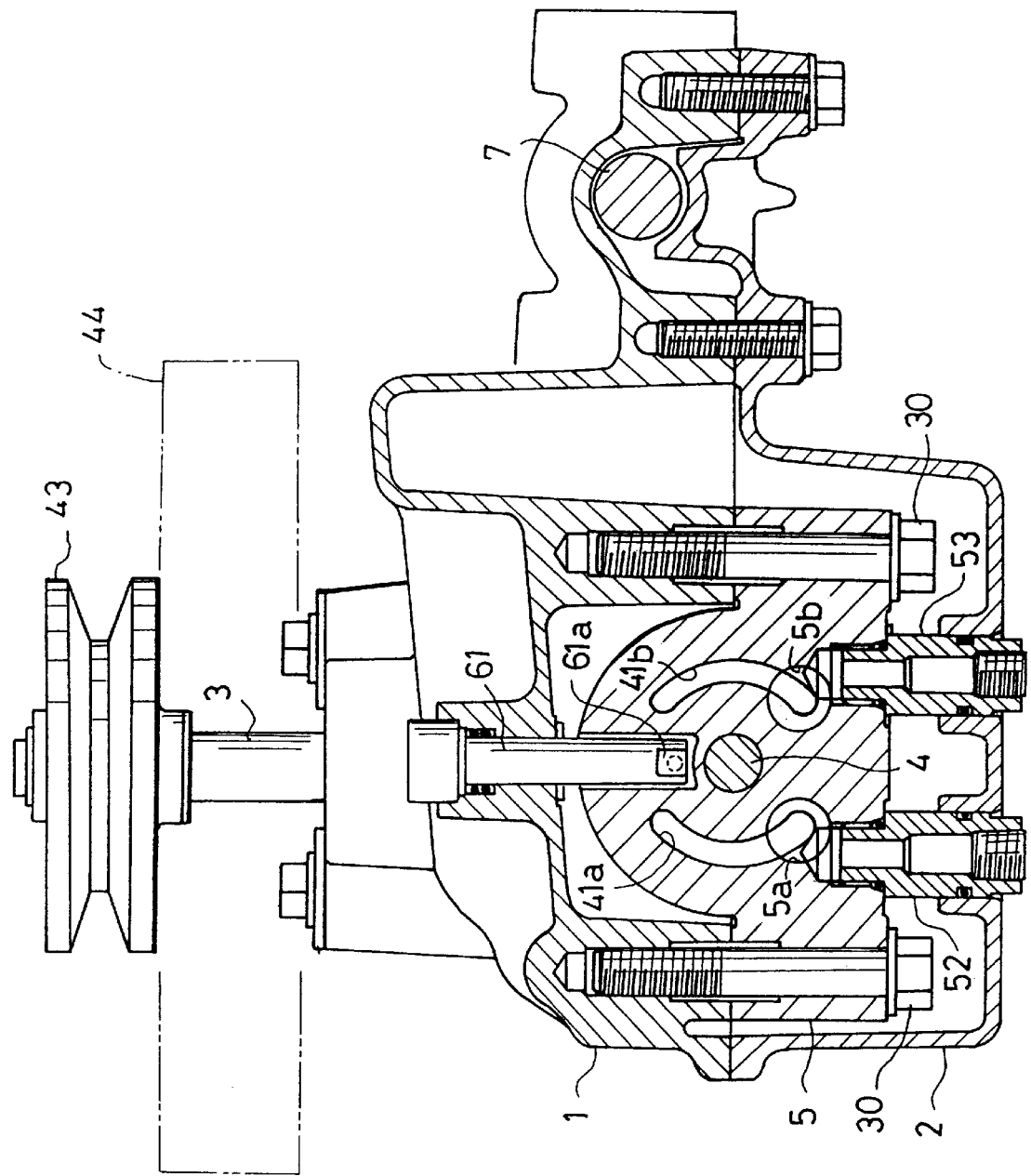
FIG. 4 is a cross-sectional view looking in the direction of arrows 4—4 in FIG. 1.

As shown in FIGS. 2 and 4, a by-pass operating arm 60 is disposed on upper half housing 1 so as to open first and second oil passages 5a and 5b into the oil sump for enabling axles 7 to be idle when the vehicle is hauled. In particular, by-pass operating arm 60 is fixed at the base thereof to an upper end of a by-pass shaft 61 which is vertically and pivotally supported to the upper wall of upper half housing 1. By-pass shaft 61 extends at the lower end thereof into vertical portion 501 of center section 5, so that a flat surface 61a formed at the side surface of the lower end thereof abuts one end of a push pin 62 which can abut at the other end thereof against the rotatable slidable surface of cylinder block 17 supported on vertical portion 501. When an operator operates by-pass operating arm 60 outside of the housing for hauling the vehicle, by-pass shaft 61 is rotated and flat surface 61a at the lower end thereof diagonally presses push pin 62 toward cylinder block 17. First and second oil passages 5a and 5b communicate with the oil sump in the housing through arcuate ports 41a and 41b, thereby enabling motor shaft 4 to be idle.

Figure 12:
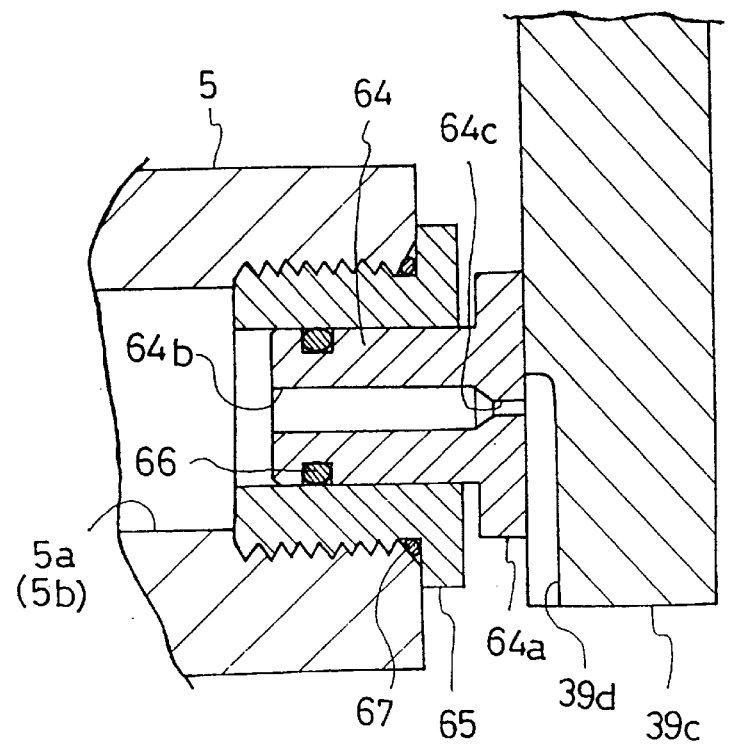
FIG. 12 is a cross-sectional view looking in the direction of arrows 12—12 in FIG. 10.

As shown in FIGS. 7, 8, 9 and 12, pistons 64 constituting the neutral return means of the present invention are horizontally and slidably disposed in the open end portions of first and second oil passages 5a and 5b which are open at the side surface of horizontal portion 500 of center section 5, opposite to vertical portion 501. Each piston 64 is cylindrical and has a large diametric flange 64a formed at the outside end thereof. Each piston 64 is slidably inserted into an axial opening through a bush 65 which is screwed into the open end of each of first and second oil passages 5a and 5b. As best seen in FIG. 12, a seal 66 is disposed between each bush 65 and the external surface of piston 64. A seal 67 is disposed between each bush 65 and center section 5. Seals 66 and 67 prevent oil from leaking. An oil passage 64b is bored along the axis of piston 64. A discharging oil hole 64c having a diameter smaller than oil passage 64b, is formed in the closed end of oil passage 64b. Each oil passage 5a and 5b can be opened to the outside of the closed fluid circuit through oil passage 64b and discharging oil hole 64c.

Figure 10:
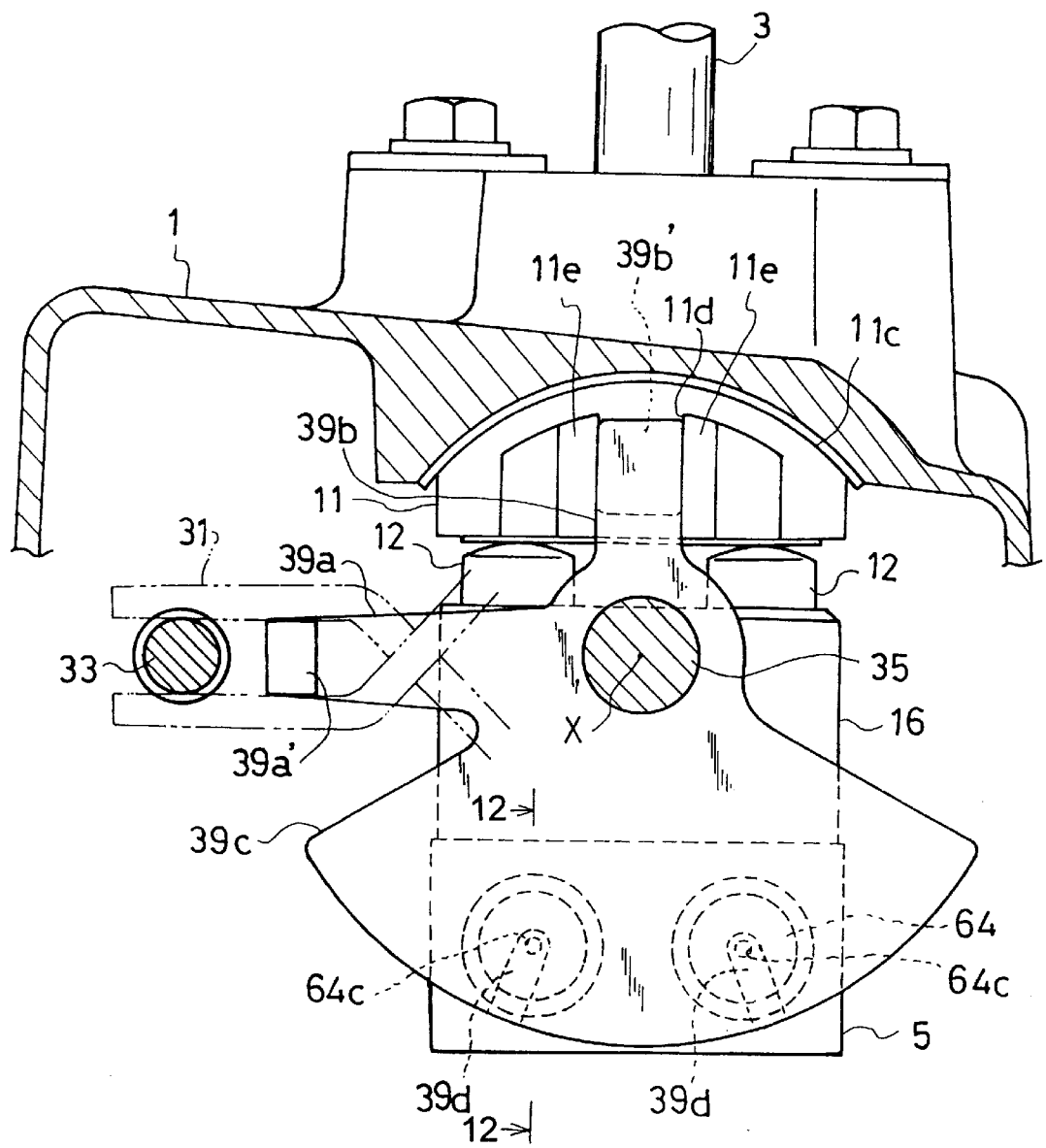
FIG. 10 is a partial cross-sectional side view of the axle driving apparatus of the present invention showing a side view of operational members of movable swash plate 11.

Movable swash plate 11 is constructed for slanting movement. As shown in FIGS. 1, 2 and 10, a bush 51 is disposed on a side wall of upper half housing 1 positioned on a phantom extension line of the center of curvature X of convex portion 11c at a back surface of movable swash plate 11. Bush 51 rotatably supports a control shaft 35. Onto the outer end of control shaft 35, outside of the housing is fixed a control lever 38 to enable movable swash plate 11 to be slantingly operated from the exterior of the housing. Control lever 38 is connected through a control rod (not shown) and may be pushed or pulled longitudinally to control a speed changing member (not shown) of the vehicle, such a lever or a pedal (not shown) provided on the vehicle.

As shown in FIG. 10, a control arm 39 is fixed to the inner end of control shaft 35 within the housing, and comprises a first arm 39a, a second arm 39b and a radially extending, fan-shaped contact plate 39c. Contact plate 39c may be divided from control arm 39 so long as contact plate 39c rotates following control arm 39.

Figure 11:
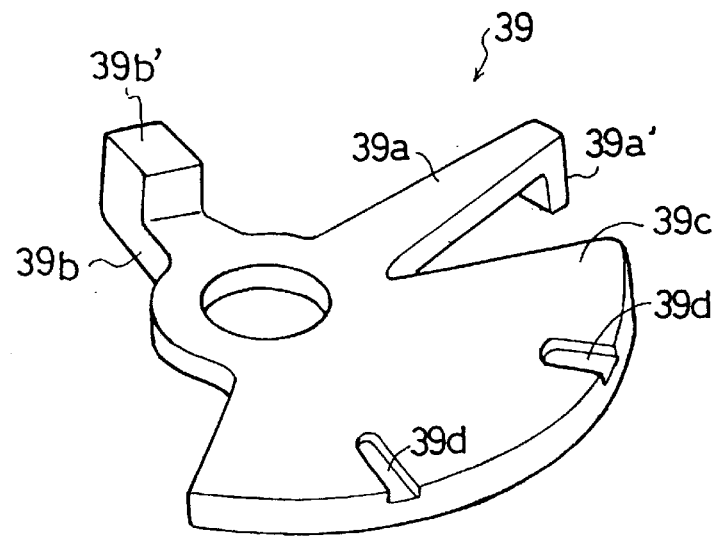
FIG. 11 is a perspective view of control arm 39.

As best seen in FIG. 11, first arm 39a extends horizontally and forms, at one end thereof, an engaging portion 39a' for paralleling control shaft 35. Second arm 39b extends upwardly and forms, at one end thereof, an engaging portion 39b' for paralleling control shaft 35. Engaging portions 39a' and 39b' project in opposite directions from each other.

Engaging portion 39b' is connected to a groove 11d provided in a side surface of movable swash plate 11. Groove 11d is formed between a pair of engaging projections 11e disposed on the side surface of movable swash plate 11 and are longitudinally spaced apart at a predetermined interval. In such a construction, when control arm 38 is rotated around an axis lateral to the vehicle body, resulting in being rotated longitudinally of the vehicle body, control arm 39 rotates longitudinally around control shaft 35 to enable movable swash plate 11 to be slantingly operated and the hydraulic pump to be operated to change the quantity and direction of its discharging oil.

As shown in FIGS. 2 and 10, a coiled neutral return spring 31 is fitted onto bush 51. Both ends of neutral return spring 31 are crossed to extend in the direction of first arm 39a and sandwich between them an eccentric shaft 33. As shown in FIG. 1, eccentric shaft 33 is mounted to an inside wall of upper half housing 1 near control shaft 35 and engaging portion 39a' formed at one end of control arm 39.

Accordingly, when control lever 38 is turned to change the vehicle speed, control arm 39 is turned and one end of neutral return spring 31 is moved away from the other end, which is received by eccentric shaft 33, thereby applying a biasing force to control lever 38 to return it to the neutral position. When operating force to the speed changing member is released, a restoring force generated at one end of neutral return spring 31 returns engaging portion 39a' toward eccentric shaft 33 so as to hold control arm 38 in the neutral position. The extension of eccentric shaft 33 outside of the housing creates an adjusting screw. When the adjusting screw is loosened and eccentric shaft 33 is rotatably shifted, control arm 39 is shifted around control shaft 35 through neutral return spring 31 so that movable swash plate 11 can be adjusted to be in an accurate neutral position.

Contact plate 39c is fan-shaped around a center of curvature X so as to abut against pistons 64 along its entire rotational range between the furthest forward and furthest rearward positions, including a neutral position. As shown in FIGS. 10, 11 and 12, grooves 39d are formed in contact plate 39c at positions which abut against discharging oil holes 64c of pistons 64 when control arm 39 is in the neutral position, and extend therefrom to the fringe of fan-shaped contact plate 39.

The interior of the closed fluid circuit is connected with the oil sump in the housing through grooves 39d and discharging oil holes 64c. When control arm 39 is rotated from the neutral position so that movable swash plate 11 is slantingly rotated beyond a predetermined angle, discharging oil holes 64c are cut off from contact with grooves 39d. The surface of contact plate 39c abutting oil holes 64c at this time is smooth and plain. As shown in FIG. 2, a retaining plate 68 is disposed at a side of contact plate 39c opposite to oil holes 64c and is fixed to the inner portion of lower half housing 2. When pistons 64 are advanced by oil pressure, contact plate 39c is sandwiched between pistons 64 and retaining plate 68 so as to be given a rotational resistance against the biasing force of neutral return spring 31.

Figure 13:
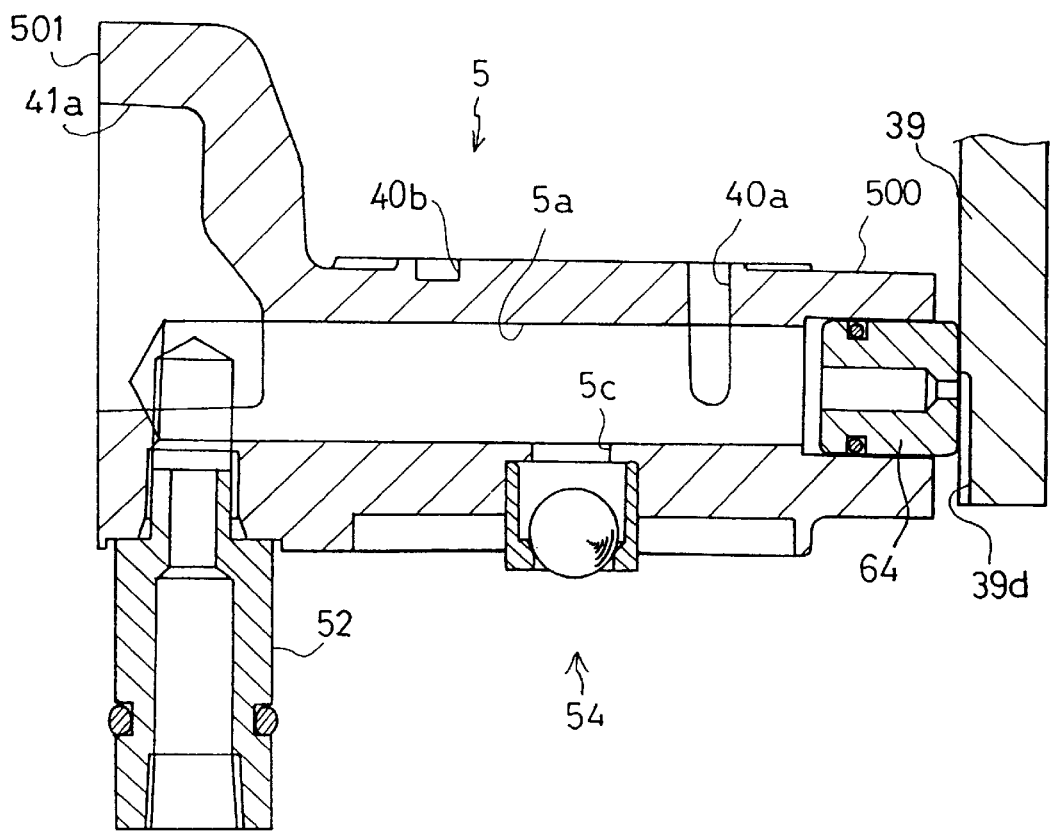
FIG. 13 is a cross-sectional view of a principal part of another embodiment of the present invention showing the disposition of pistons 64 in center section 5.

Alternatively, contact plate 39c may be disposed between pistons 64 and the inner wall of lower half housing 2, without a retaining plate 68 so as to provide rotational resistance directly by the inner wall of lower half housing 2. Further, rather than being screwed into bushes 65 in the open ends of first oil passage 5a and second oil passage 5b, pistons 64 can be directly, slidably inserted into the open ends of first oil passage 5a and second oil passage 5b, as shown in FIG. 13.

When control lever 38 is rotated by operating a speed changing member, control arm 39 is rotated by control shaft 35 so as to slantingly rotate movable swash plate 11 which is connected by engaging portion 39b' to engaging projections 11e thereof, thereby changing the quantity of fluid discharged from the hydraulic pump. Accordingly, the rotational direction and speed of motor shaft 4 of the hydraulic motor is shifted to correspond with the rotational direction and degree of the speed changing member, so as to transmit driving force to axles 7.

In this case, whichever of first oil passage 5a and second oil passage 5b has higher pressure oil receives pressure in proportion to the load on axles 7 so that one of pistons 64 slides outwardly and pushes against contact plate 39c of control arm 39. The friction force generated by such pushing is set to be smaller than the biasing force of neutral return spring 31. Therefore, an operator must operate the speed changing member with an operating force exceeding the friction force and the biasing force. After movable swash plate 11 is slantingly rotated beyond the predetermined position, discharging oil holes 64c of pistons 64 are sealed by the smooth and plain surface of contact plate 39c, whereby operating oil circulating in the closed fluid circuit does not leak therefrom so as to maintain the volume efficiency of the HST.

In such a condition, when the operator releases operating force applied to the speed changing member, control arm 39 is rotated toward the neutral position by the biasing force of neutral return spring 31. Pressure of piston 64 generates a friction force against contact plate 39c of contact plate 39, as above mentioned, causing a resistant against the rotation toward the neutral position. Thereby, control arm 39 is gradually rotated toward the neutral position. As a result, a dynamic brake is not applied so that a vehicle does not stop suddenly.

When control arm 39 reaches the proximity of the neutral position, discharging oil holes 64c of pistons 64 communicate with grooves 39d so that the pushing force of pistons 64 against contact plate 39c and any remaining pressure in the closed fluid circuit escapes, thereby moderating the braking shock and enlarging the range of the neutral position of the HST.

One of pistons 64 is disposed in the high-pressure oil passage for running the vehicle in a forward direction, the other is disposed in the high-pressure oil passage running the vehicle in a reverse direction. Both of the high-pressure oil passages, first oil passage 5a and second oil passage 5b, are separated from each other so that an operational condition of one piston 64 does not interfere with that of the other piston 64. Hence, the operational condition of each piston 64 can be adjusted individually so as to enable each of the friction forces against contact plate 39c to meet the individual requirements to braking the vehicle when advancing and when backing the vehicle up. As a result, a vehicle can avoid stop shock when braking both in the case of an advancing vehicle and one that is backing up.

Figure 14:
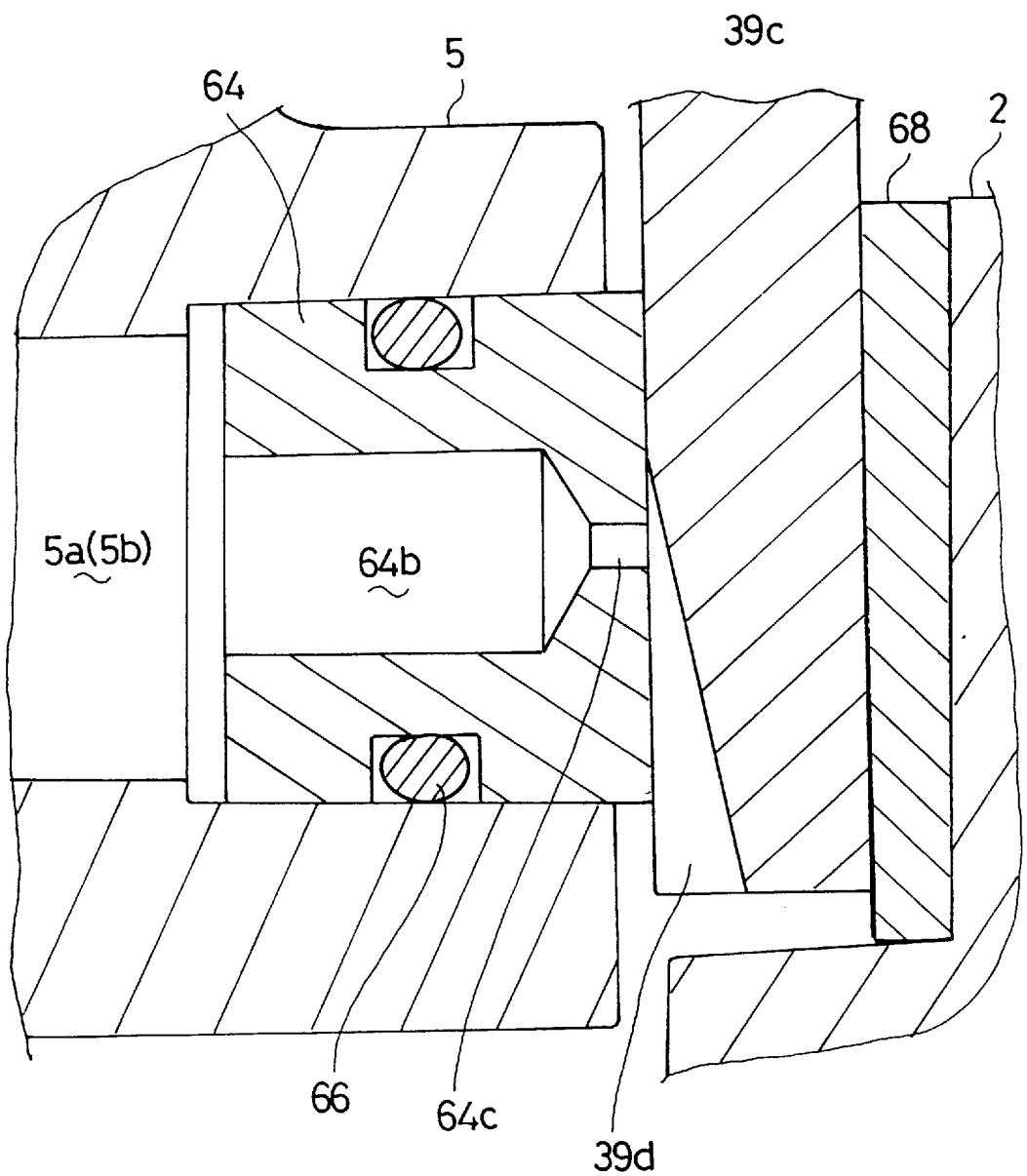
FIG. 14 is a cross-sectional view of a principal part of a further embodiment of the present invention showing the shape of groove 39d on the surface of control arm 39 in contact with piston 64.
Figure 15:
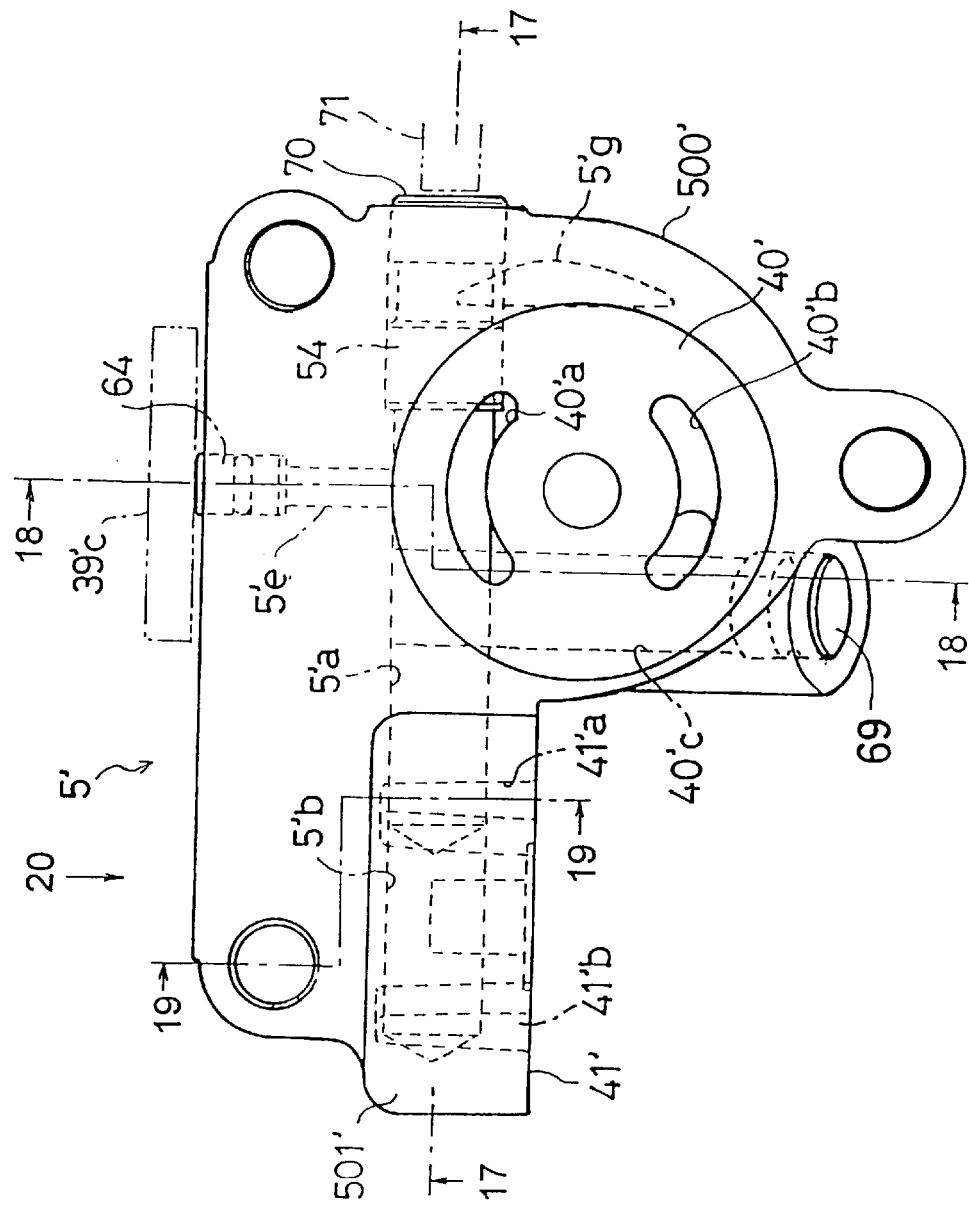
FIG. 15 is a plan view of center section 5'.

The operational condition of each piston 64 can be adjusted by modifying the diameter of discharging oil hole 64c and/or the width or shape of groove 39d. In FIG. 14 is disclosed an alternative embodiment of the present invention in which the shape of groove 39d has been modified. In this embodiment, the depth of the grove varies in that groove 39d is shallower the closer it is to communicating with discharging oil hole 64c. This modification of groove 39d can also be applied to the embodiment of the invention in which bush 65 is interposed between piston 64 and center section 5, as shown in FIG. 12.

Figure 16:
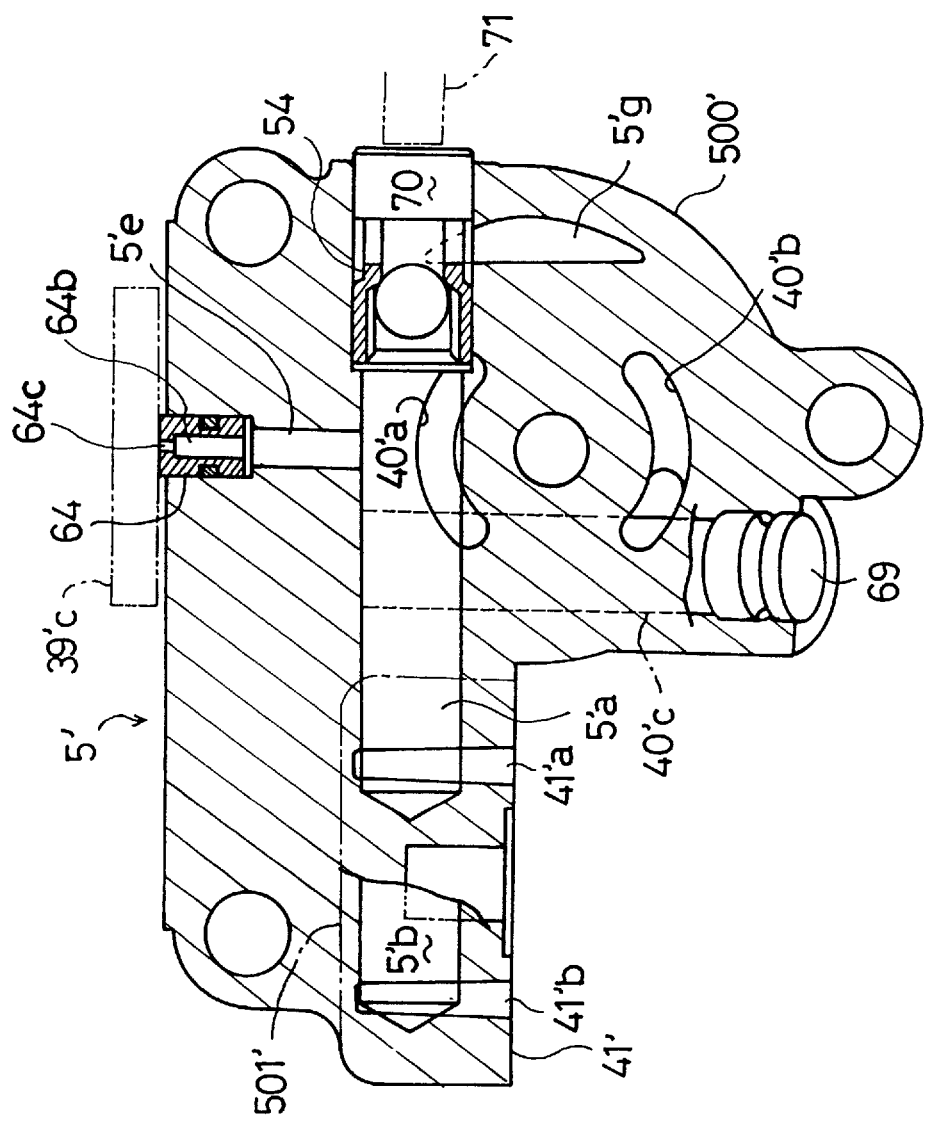
FIG. 16 is a cross-sectional plan view of center section 5'.
Figure 17:
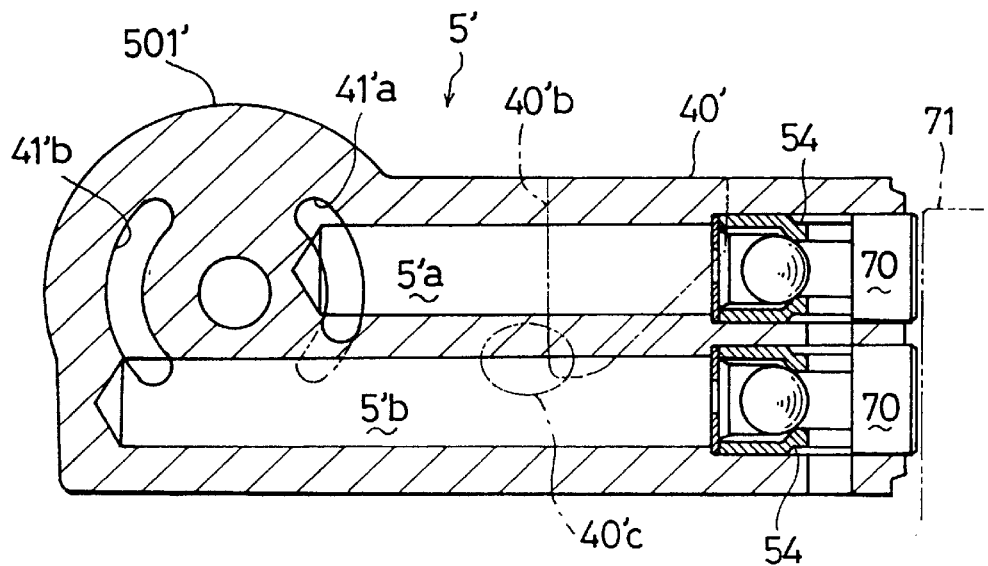
FIG. 17 is a cross-sectional view looking in the direction of arrows 17—17 in FIG. 15.

As shown in FIGS. 8 and 9, the above mentioned center section 5 includes first oil passage 5a and second oil passage 5b in parallel to each other on a common horizontal plane. In FIGS. from 15–20, alternative embodiment of the present invention will be described which comprises a center section 5' instead of center section 5. In this embodiment, center section 5' includes a horizontal first oil passage 5'a and a horizontal second oil passage 5'b disposed in parallel to each other along a common vertical plane, so that first and second oil passages 5'a and 5'b overlap with each other as seen in the cross-sectional plan view of FIG. 16. As best seen in FIG. 17, each of kidney ports 41'a and 41'b which are open at a motor mounting surface 41' formed on the vertical portion 501' of center section 5', communicates with one end of each of first and second oil passages 5'a and 5'b, respectively.

Figure 18:
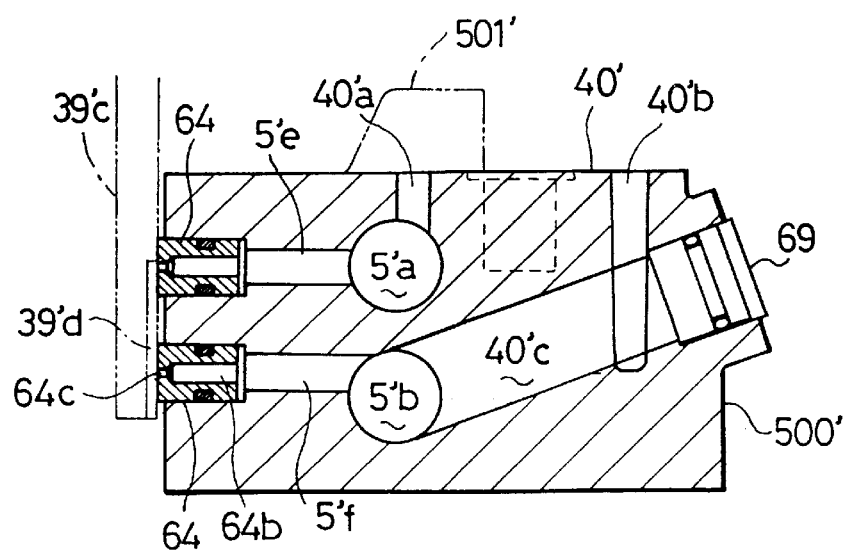
FIG. 18 is a cross-sectional view looking in the direction of arrows 18—18 in FIG. 15.
Figure 19:
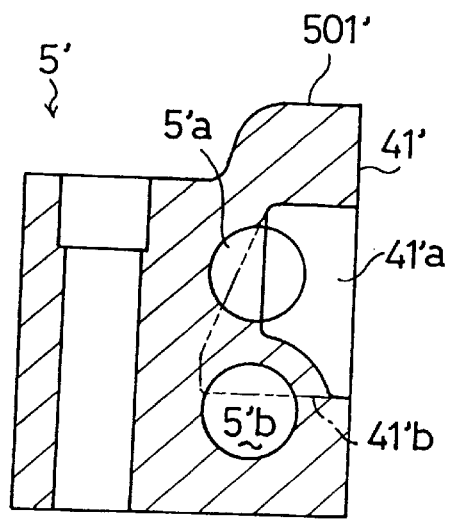
FIG. 19 is a cross-sectional view looking in the direction of arrows 19—19 in FIG. 15.

Kidney ports 40'a and 40'b are open at a pump mounting surface 40' formed on a horizontal portion 500' of center section 5'. Kidney port 40'a is open above first oil passage 5'a and extends downwardly to directly communicate with oil passage 5'a. As best seen in FIG. 18, kidney port 40'b is above, but to one side of second oil passage 5'b and communicates with second oil passage 5'b through a connecting oil passage 40'c which is slantingly and downwardly disposed from the outside of center section 5' to second oil passage 5'b. The outer open end of connecting oil passage 40'c is closed by a plug 69.

As seen in FIG. 17, the other ends of first and second oil passages 5'a and 5'b are open along an outside surface of horizontal portion 500'. A check valve 54 is disposed in each of the open ends of oil passages 5'a and 5'b for supplying oil to the closed fluid circuit. Each check valve 54 is closed by a plug 70. Each outer end of plug 70 abuts against a projections 71 formed along an inner surface of the housing to prevent the plugs 70 from slipping out.

A supply port 5'g is open at the lower surface of horizontal portion 500' and extends upwardly within center section 5' communicating with the entrance ports of check valves 54 in both first and second oil passages 5'a and 5'b. Supply port 5'g opens within an oil filter 56 disposed between the bottom of center section 5' and the bottom surface of lower half housing 2, as the previously described embodiments. Each of first and second oil passages 5'a and 5'b is supplied with oil from the housing which is filtered by oil filter 56 through supply port 5'g and check valves 54.

An oil holes 5'e and 5'f is horizontally branched from first and second oil passages 5a' and 5'b, respectively toward one side surface of center section 5'. The outer opening end of each of oil holes 5'e and 5'f is provided with a piston 64. In this embodiment, a flange and bush, as in the previous embodiments are not used.

Figure 20:
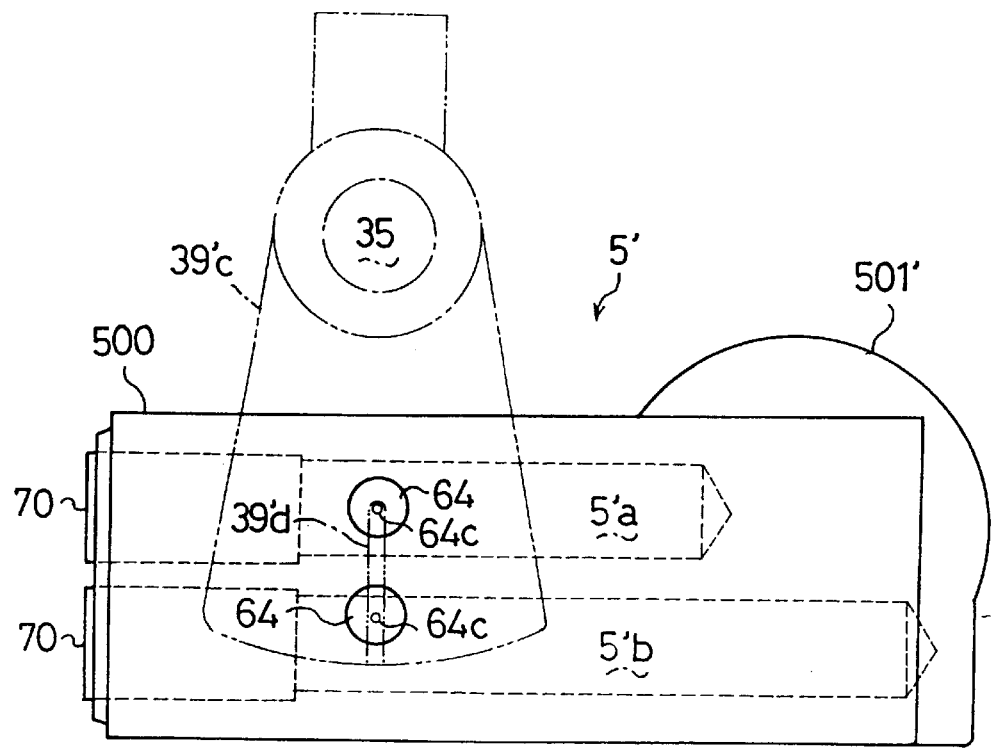
FIG. 20 is a side view looking in the direction of arrow 20 in FIG. 15.

Both oil holes 5'e and 5'f are disposed in parallel to each other with their axes along a common vertical plane so that pistons 64 are disposed in a vertical row, as shown in FIGS. 18 and 20. Accordingly, only one groove 39'd is formed on contact plate 39' along a surface which abuts against pistons 64 and communicates with both discharging oil holes 64c of pistons 64 simultaneously when contact plate 39'c is positioned in the neutral position. Because contact plate 39'c has only one groove 39'd, it can be more narrow as compared with contact plate 39c of the previous embodiments so as to make the space around it more compact.

When it is desired to moderate the difference in braking shock caused by advancing and backing of the vehicle, the braking shocks may be individually moderated by modifying the diameter of discharging oil holes 64c of pistons 64.

Figure 21:
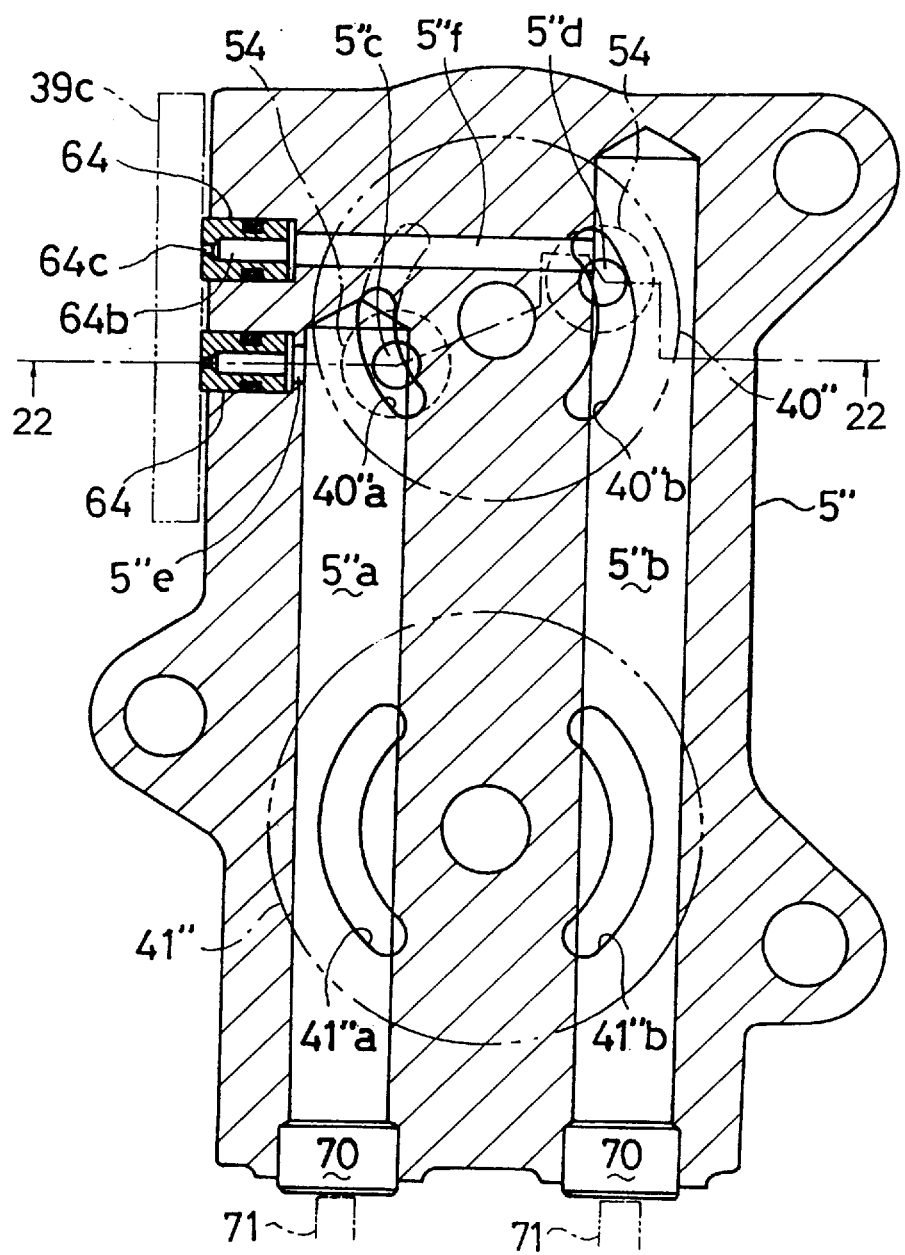
FIG. 21 is a cross-sectional plan view of center section 5"
Figure 22:
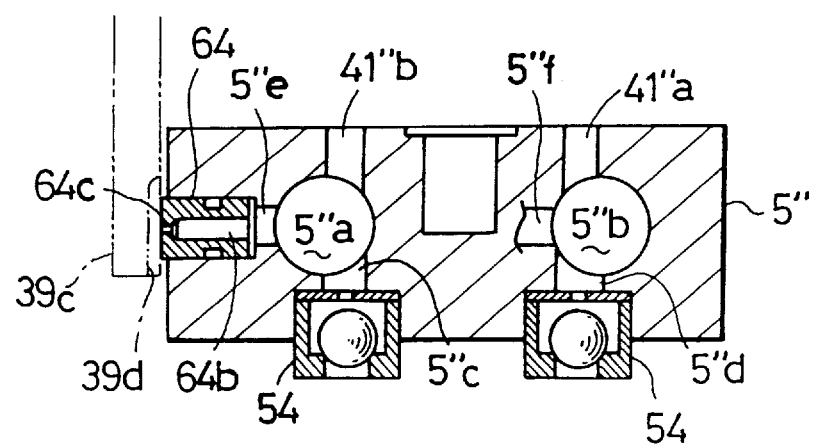
FIG. 22 is a cross-sectional view looking in the direction of arrows 22—22 in FIG. 21.

Center sections 5 and 5' mentioned above, which form pump mounting surfaces 40 and 40', respectively and motor mounting surfaces 41 and 41', respectively which are perpendicular to each other, may be adapted to an HST having a pump shaft and a motor shaft which are disposed in parallel to each other. Such a center section is shown in FIGS. 21 and 22 in which center section 5" forms a plate for an HST having a pump shaft 3 and a motor shaft 4 which are disposed in parallel to each other.

Center section 5" is formed as a thin plate. Both a pump mounting surface 40" and a motor mounting surface 41" are formed along a the top surface thereof. A first oil passage 5"a and a second oil passage 5"b are bored in center section 5" below pump mounting surface 40" and motor mounting surface 41". First and second oil passages 5"a and 5"b are disposed in parallel to each other on a common horizontal plane. Kidney ports 40"a and 40"b are open at pump mounting surface 40". Kidney ports 41"a and 41"b are open at motor mounting surface 41". Kidney ports 40"a and 41"a extend downwardly and communicate with first oil passage 5"a. Kidney ports 40"b and 41"b extend downwardly and communicate with second oil passage 5"b.

An oil hole 5"c and an oil hole 5"d extend downwardly from first and second oil passages 5"a and 5"b, respectively. In the opening of each of oil holes 5"c and 5"d which are open at the bottom surface of center section 5" is disposed a check valve 54 so as to enable operating oil to be supplied from the oil sump in the housing to each of first and second oil passages 5"a and 5"b.

One end of each of first and second oil passages 5"a and 5"b is open at one side surface of center section 5" and is closed by plug 70. Each plug 70 abuts against a projection 71 formed at the interior of the housing. First and second oil passages 5"a and 5"b differ in length so that the other end of first passage 5"a is offset from the other end of second oil passage 5"b. Horizontal oil holes 5"e and 5"f are branched perpendicularly from approximate the inner ends of first and second oil passages 5"a and 5"b, respectively. Both oil holes 5"e and 5"f are open at another side surface of center section 5". A pistons 64, as discussed above, is disposed in each opening of oil holes 5"e and 5"f. At the exterior side of pistons 64 is disposed contact plate 39 having a pair of grooves 39d, as discussed above.

Another embodiment of an axle driving apparatus will be described with reference to FIGS. 23, 24 and 25. The HST of the axle driving apparatus of previously described embodiments includes a pump shaft 3 and motor shaft 4 which are disposed perpendicular to each other and have a movable swash plate 11 of a cradle-type which is separated from a control arm 39 or 39' for the hydraulic pump. The axle driving apparatus of this alternative embodiment has a center section 5", as shown in FIGS. 21 and 22 for supporting pump shaft 3 and motor shaft 4 in parallel to each other and has a trunnion-type movable swash plate 11' which forms a control shaft as single body. Center section 5" in FIGS. 21 and 22 differs from that in FIG. 23 and 24 in, among other things, appearance and the shape of the oil holes, however, the technical idea of the latter center section 5" is the same as that of the former.

Figure 23:
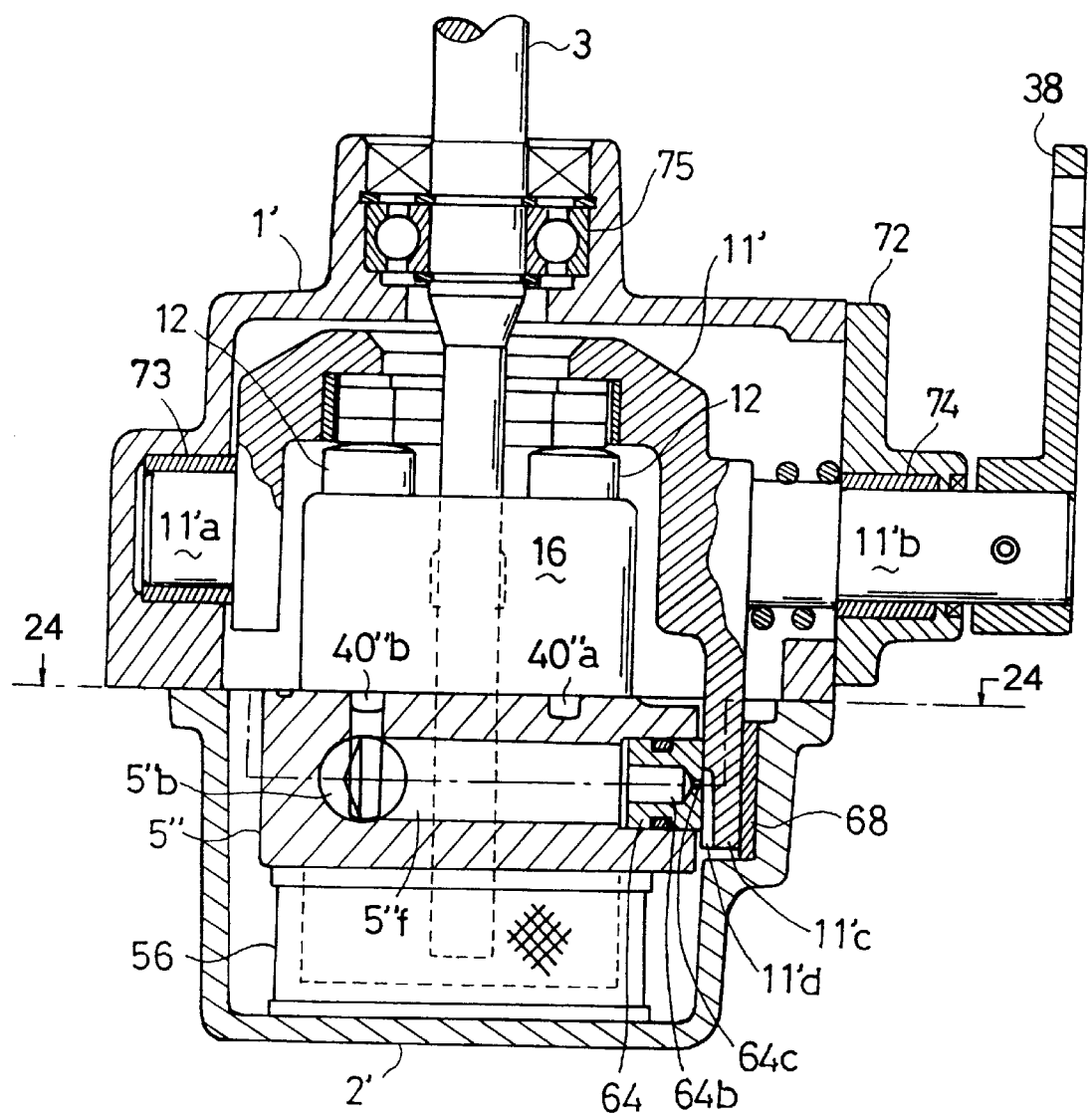
FIG. 23 is a vertical rear elevation view of another embodiment of an axle driving apparatus containing center section 5" of FIG. 21.
Figure 24:
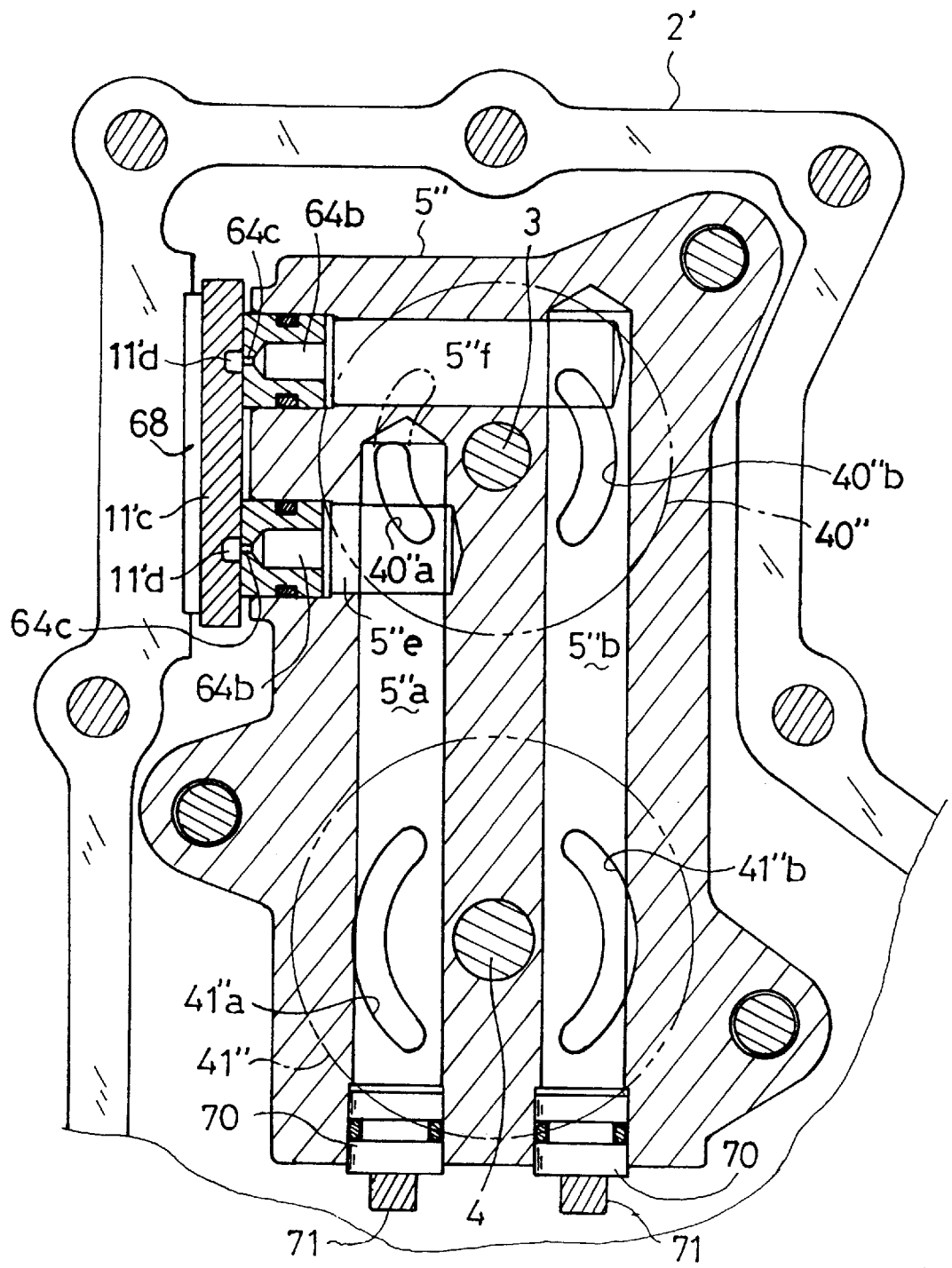
FIG. 24 is a cross-sectional view looking in the direction of the arrows 24—24 in FIG. 23.
Figure 25:
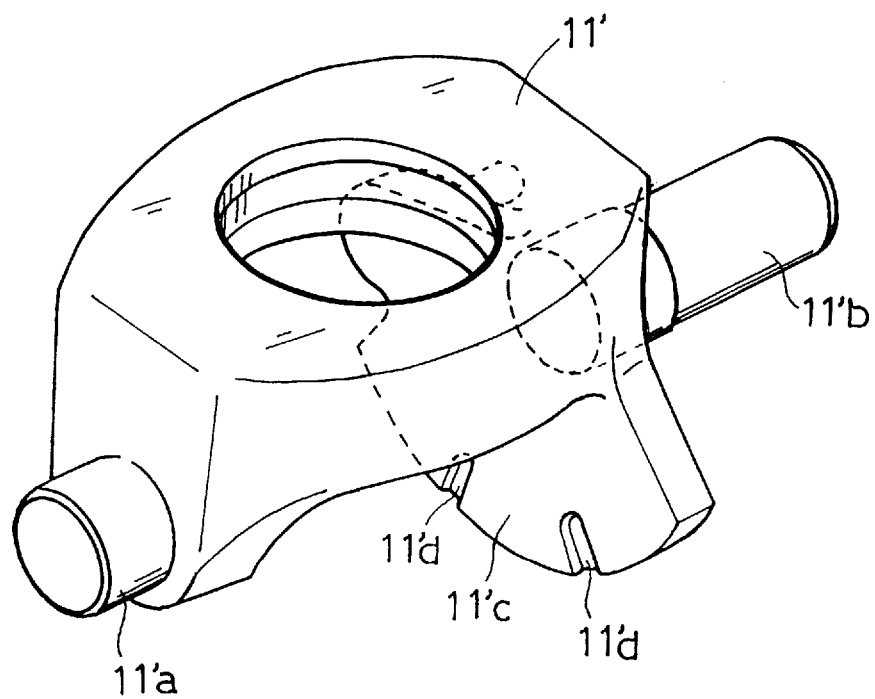
FIG. 25 is a perspective view of a movable swash plate 11' for the axle driving apparatus shown in FIG. 23.

With specific reference to FIGS. 23–25, center section 5" is disposed within a lower half housing 2'. On pump mounting surface 40" and motor mounting surface 41" formed on the upper surface thereof, is mounted a cylinder blocks for the hydraulic pump and a cylinder block for the hydraulic motor, respectively, thereby constituting an HST. Pump shaft 3 is connected with cylinder block 16 of the hydraulic pump and is vertically disposed and rotatably supported through bearings 75 at the upper portion of upper half housing 1'. The lower end thereof is rotatably inserted into center section 5". Movable swash plate 11', which is of a trunnion-type, is disposed above cylinder block 16 in upper half housing 1'.

The entire movable swash plate 11' is shown in FIG. 25. A pair of trunnion shafts 11'a and 11'b are formed on movable swash plate 11' and project in opposite directions from both sides thereof. A fan-shaped contact plate 11'c, equivalent to contact plate 39c, is formed below the base end of trunnion shaft 11'b, equivalent to control shaft 35. A pair of grooves 11'd, equivalent to grooves 39d, are formed at an inner surface of contact plate 11'c.

In upper half housing 1', trunnion shaft 11'a is supported by a side wall thereof through a bush 73. Trunnion shaft 11'b is supported by a lid 72 attached to upper half housing 1' through an other bush 74. Control lever 38 is fixed to the exterior portion of trunnion shaft 11'b projecting from lid 72. The surface of contact plate 11'c forming the pair of grooves 11'd abuts against the utmost ends of pistons 64 inserted into center section 5". Restraining plate 68 is interposed between the inner wall of lower half housing 2' and contact plate 11'c. Such a construction constitutes a neutral return position member for returning the movable swash plate 11' to the neutral position effecting the same as that comprising pistons 64 and contact plate 39c, described above.

The present invention construsted as described above has the following effects:

When the operating force on a speed changing member is released and a the movable swash plate naturally rotatably returns to the neutral position, a control arm connected with the movable swash plate is pressed against pistons so as to generate a friction force reducing the rotational force of the movable swash plate. Hence, the movable swash plate rotates slowly so as to prevent a vehicle from a sudden stop.

Since the pistons are slidably inserted into a center section, it is not necessary to otherwise provide a space for disposing cylinders for pistons. The piston is also used for a plug closing a closed fluid circuit. Hence, a neutral position return means of an axle driving apparatus may be constructed more simply, may reduce the space for its disposal on a vehicle, may reduce the number of parts required.

Since remaining oil pressure is released out of the closed fluid circuit by draining surplus oil therefrom through discharging oil holes of the pistons in proximity to the neutral position within rotational range of the speed changing member, the braking shock can be moderated and the neutral position can be sufficiently maintained.

Further, since the discharging oil holes of the pistons are closed automatically when the speed changing member comes out of the proximity of the neutral position, oil is not drained out of the closed fluid circuit so as to maintain the oil volume of the HST at an efficient level.

What is claimed is:

1. A hydrostatic transmission comprising:
   a hydraulic pump and a hydraulic motor fluidly connected with each other through a closed fluid circuit for circulating operating oil between said hydraulic pump and said hydraulic motor:

a movable swash plate for changing a quantity of oil discharged by said hydraulic pump;

a control arm engaging with said movable swash plate;

a biasing means provided for returning said movable swash plate which has been slantingly rotated to a neutral position when an operating force is released therefrom;

a center section, disposed in a housing, in which said closed fluid circuit is disposed; and a piston disposed within said center section, wherein said piston is slid out of said center section by the pressure of operating oil in said closed fluid circuit and presses against said control arm when said movable swash plate is slantingly rotated out of the neutral position.

2. A hydrostatic transmission according to claim 1, further comprising:

a pair of oil passages constituting said closed fluid circuit bored within said center section, wherein said piston is inserted into one of said pair of oil passages thereby closing an open end of said one oil passage, and enabling an utmost end of said piston to slide out of said center section; and a portion of said control arm abutting against the utmost end of said piston.

3. A hydrostatic transmission according to claim 2, further comprising:

a discharging oil hole bored within said piston and opening at an utmost end of said piston, wherein a portion of the operating oil in said closed fluid circuit which operates said piston is drained to an interior of said housing through said discharging oil hole; and a groove formed along a surface of said control arm abutting against said piston, wherein said discharging oil hole communicates with said interior of said housing through said groove while said movable swash plate is rotated between the neutral position and a predetermined position.

* * * * *